Nov. 29, 1966    G. R. PEREZ ETAL    3,287,781
AUTOMATICALLY RELEASED COUPLINGS
Filed Sept. 11, 1964    3 Sheets-Sheet 1

INVENTORS
George R. Perez &
Juan A. Perez
BY Wentworth B. Clapham
D Choylause
ATTORNEYS Nov. 29, 1966 G. R. PEREZ ETAL 3,287,781
AUTOMATICALLY RELEASED COUPLINGS Filed Sept. 11, 1964 3 Sheets-Sheet 2

INVENTORS
George R. Perez &
Juan A. Perez
BY Wentworth B. Clapham
D.C. Roylance
ATTORNEYS Nov. 29, 1966   G. R. PEREZ ETAL   3,287,781
AUTOMATICALLY RELEASED COUPLINGS
Filed Sept. 11, 1964   3 Sheets-Sheet 3

INVENTORS
George R. Perez &
Juan A. Perez

BY Wentworth B. Clapham
D. C. Roylance
ATTORNEYS

United States Patent Office 3,287,781
Patented Nov. 29, 1966

3,287,781
AUTOMATICALLY RELEASED COUPLINGS
George R. Perez and Juan A. Perez, Alexandria, Va., assignors to American Machine & Foundry Company, a corporation of New Jersey
Filed Sept. 11, 1964, Ser. No. 395,659
12 Claims. (Cl. 24—230)

This invention relates to automatically released connectors and, more particularly, to such devices specially applicable to underwater use, as in releasably connecting a buoyant object or device to an anchor line or the like.

In numerous fields, there are requirements for line connector devices which can be released automatically, as at the end of a predetermined time period or in response to a signal from a remote point, and are capable of sustaining relatively large tension loads under rigorous environmental conditions. In oceanographic work, for example, it is frequently necessary to releasably secure a buoy or the like to an anchor line in a location which may be thousands of feet beneath the surface of the ocean and to release the same after it has been submerged for a predetermined time, or at will, in response to a signal from a transmitter at the surface.

It is a general object of this invention to devise an improved connector which is capable of handling greater loads, and of being automatically released with greater dependability and accuracy in response to command, than has heretofore been attainable.

Another object is to provide an automatically releasable connector which is not sensitive to pressure and other environmental conditions encountered in oceanographic work.

A further object is to provide an automatically releasable connector which, though capable of sustaining great loads and operating with a high degree of dependability, is easily fabricated at low cost and does not require precision parts.

Yet another object is to provide a device of the type described which can be assembled and operated by personnel without special skill or experience.

In order that the manner in which the foregoing and other objects are attained in accordance with the invention can be understood in detail, a particularly advantageous embodiment thereof will be described with reference to the accompanying drawings, which form a part of this invention, and wherein.

Figure 1:
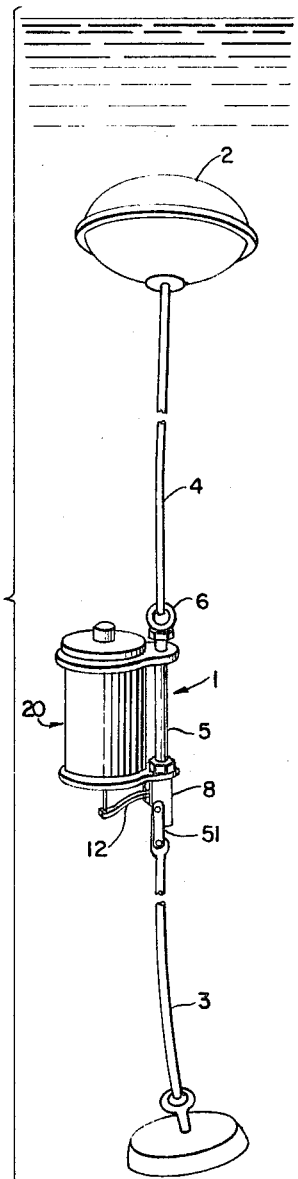
FIGURE 1 is a pictorial representation of a connector device employed in accordance with the invention to secure a submerged buoy to an anchor line.

Referring now to the drawings in detail, FIGURE 1 illustrates a typical oceanographic use of the invention, with the connector device 1 serving to secure the buoy 2 to an anchor line 3. Buoy 2 can take various forms and be employed for numerous purposes, such as the testing of materials under deep-water conditions, the detection of sewerage or other contaminants, and similar purposes.

Figure 6:
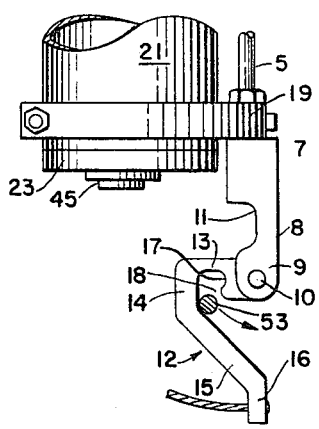
FIGURE 6 is a fragmentary side elevational view of the connector device of FIGURE 1 actuated to released condition.
Figure 5:
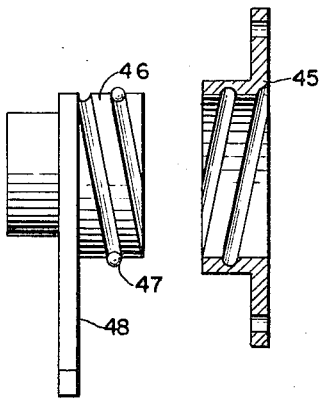
FIGURE 5 is an exploded view, partly in side elevation and partly in axial section, of a ball-screw device employed in the connector device of FIGURE 4.

The connector device 1 comprises a rod 5 provided at one end with an eye 6 to which the buoy is attached via line 4, the other end of the rod being fixed, as by a threaded connection, to the base 7 of a clevis 8. Clevis 8 is of U-shape, the flat side arms 9 thereof being spaced apart and parallel. A cylindrical pin 10 extends between the end portions of arms 9, the ends of the pin being rigidly affixed to the respective arms 9. As seen in FIGURE 6, the side arms 9 are each provided with a laterally opening notch 11, notches 11 both opening in the same direction.

Pivotally carried by pin 10 is a hook member 12 having a first portion 13, which extends radially from pin 10, a second portion 14 projecting laterally from portion 13, and a third portion 15 which slants away from the tip of portion 14 in such fashion that, when pin 10 is horizontal and portion 13 projects upwardly therefrom, portion 15 slants downwardly and outwardly away from pin 10 and portion 13. Portion 15 terminates in a tip 16 parallel to portion 14 and at right angles to portion 13. Portion 13 of the hook member includes a notch 17, in the form of part of a circle, so disposed as to open upwardly, toward the base 7 of the clevis, when portion 13 projects upwardly. Notch 17 communicates with free space, at 18, between portion 14 and the adjacent part of portion 13.

Rigidly secured to rod 5, as by clamps 19, is a housing 20 comprising a cylindrical main body 21 which extends parallel to rod 5 and is closed and sealed by end caps 22 and 23. Typically, the end caps are flanged and rigidly secured to body 21 by screws 24, FIGURE 2, and are suitably grooved to accommodate O-rings or like seals, as at 25, to prevent entrance of water into the housing.

Figure 2:
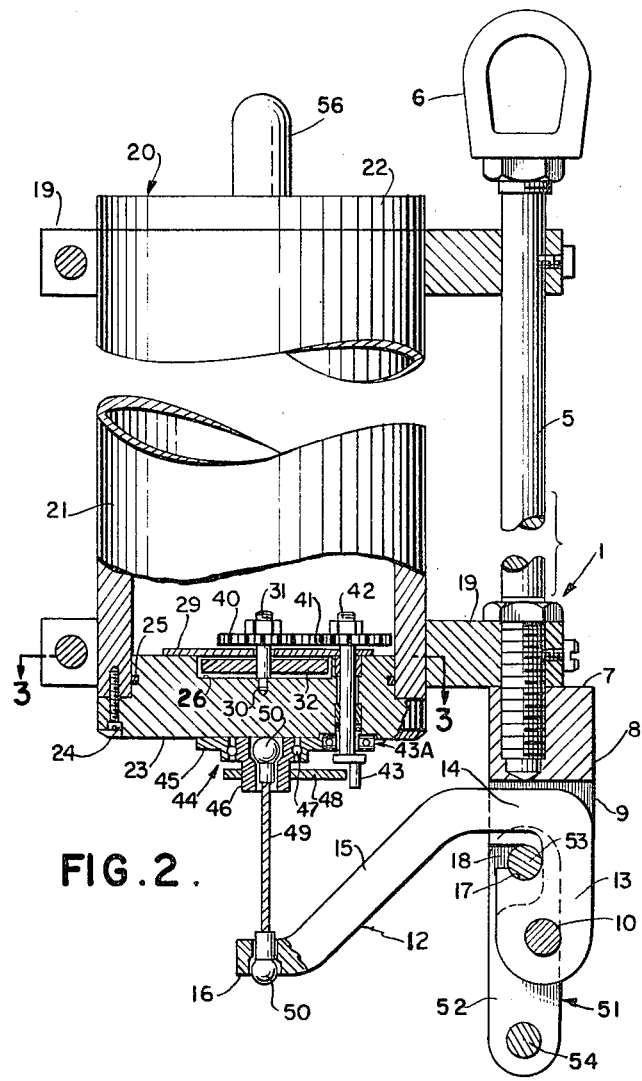
FIGURE 2 is a view, partly in side elevation and partly in vertical section, of the connector device of FIGURE 1.
Figure 3:
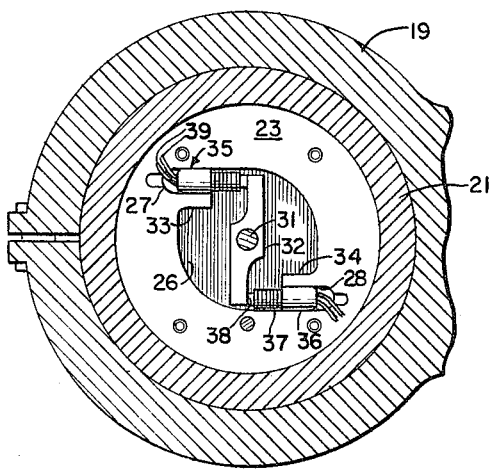
FIGURE 3 is a transverse sectional view taken on line 3—3, FIGURE 2.
Figure 4:
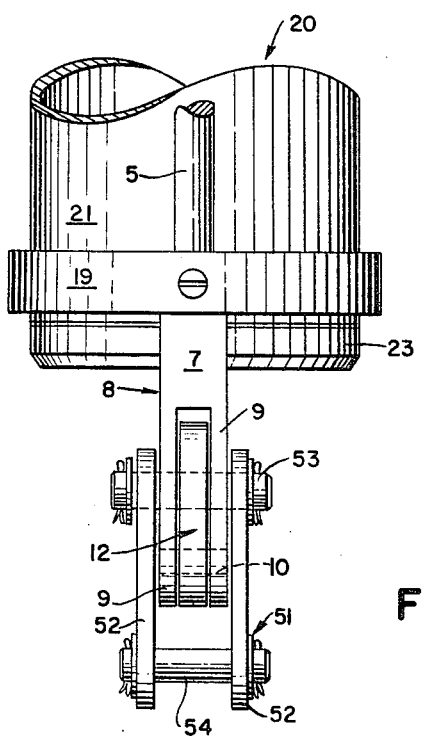
FIGURE 4 is fragmentary side elevational view of the connector device of FIGURE 1.

End cap 23, which is located at the bottom of housing 20 when the connector device is in upright position, is provided at its inner face with an upwardly opening recess 26, FIGURES 2 and 3, which includes a main circular portion and two generally tangentially extending portions 27 and 28 which are disposed at diametrically opposed locations across the circular portion and both open inwardly into the circular portion of the recess. The recess 26 is closed by a cover plate 29 provided with a circular opening aligned above a cylindrical recess 30 in the bottom wall of, and at the center of, the bottom surface of the main circular portion of recess 26.

A shaft 31 extends freely through the circular opening in cover plate 29 and has its lower end rotatably supported in recess 30, the upper end portion of shaft 31 projecting well above plate 29. An angularly displaceable member 32, in the nature of a rigid arm in this embodiment of the invention, is fixed at its center to shaft 31 beneath cover plate 29, arm 32 being disposed within the circular portion of recess 26 and being of such length that its ends lie adjacent the side wals of the circular portion of the recess. Accordingly, arm 32 can occupy a position, as seen in FIGURE 3, in which its ends each project across the mouth of a different one of the generally tangential portions 27 and 28. The configuration of recess 26, including chordal wall portions 33 and 34, FIGURE 3, is such as to allow arm 32 to have limited freedom of rotary movement, about the axis of shaft 31, through slightly more than 90°.

Each portion 27, 28 of recess 26 accommodates a conventional actuator squib 35 comprising a cylindrical casing 36, containing the usual explosive charge, and an initially contracted, axially expansible bellows 37, the interior of bellows 37 communicating with the interior of chamber 36 so that the combustion gases, generated upon firing of the squib, enter the bellows and cause the same to expand. At its tip, each bellows 37 is closed and equipped with a pusher button 38 to engage and actuate arm 32. The squibs 35 are electrically fired, via conductors 39, FIGURE 3, the conductors being connected to a suitable electrical circuit (not shown) for accomplishing simultaneous firing of both squibs in response to occurrence of a predetermined event, such as termination of a given period of elapsed time, presence of an electrical or acoustic command signal, or the like.

Above cover plate 29, there is fixed to shaft 31 a gear 40 meshed with a gear 41 fixed to a second shaft 42. Shaft 42 extends through a suitable bore in end cap 24 and is journalled in bearings disposed in the bore. Shaft 42 projects below the bottom face of end cap 24 and terminates in a stop prong 43 which projects longitudinally from the shaft at a point displaced radially from the central axis of the shaft. As shaft 42 turns, prong 43 moves between a position nearer the center of the end cap and a position farther from the center thereof. Thrust bearing 43A is provided to accommodate axial loads imposed on shaft 42 by hydrostatic pressures acting on the outside of the housing when the device is submerged.

To provide for releasably retaining the hook member 12 in its raised position, as in FIGURE 2, a ball-travelling nut device 44 is mounted at the center of the lower face of end cap 24. Device 44 comprises a nut member 45, fixedly attached in any suitable fashion to end cap 24, and a bolt member 46, the nut and bolt members having cooperating helical leads which retain balls 47. The inner diameter of the nut member is slightly larger than the outer diameter of the bolt member, and balls 47 are of sufficient diameter to retain the bolt member rigidly in place within the nut member so long as the bolt member is prevented from rotating. When the bolt member is allowed to rotate freely, however, a downward pressure applied to the bolt member will cause the same to become disengaged from the nut member.

Rigidly secured to bolt member 46, and projecting radially therefrom, is a restraining arm 48. Arm 48 is of such length, and is so disposed on member 46, that, when the device 44 is assembled as seen in FIGURE 2, the tip of arm 48 occupies a position in which it is engaged by stop prong 43, when the prong is in its position nearer the ball-travelling nut device. Hence, when prong 43 is in that position, bolt member 46 is held against rotation and, therefore, is rigidly secured against axial movement. On the other hand, if shaft 42 is rotated to swing prong 43 to its outermost position, beyond the tip of arm 48, arm 48 is then free to turn and, since bolt member 46 can now turn, the bolt member can be disengaged from nut member 45 by any axial force applied downwardly to the bolt member.

The normal positional relationships between shaft 42, with its prong 43, gears 40 and 41, shaft 31, and arm 32 are such that, when arm 32 is in its initial position (FIGURE 3) ready for actuation by squibs 35, the stop prong 43 is in its innermost position and, therefore, engages arm 48 to prevent that arm and bolt member 46 from turning. When squibs 35 are actuated, arm 32 is angularly displaced, in a clockwise direction as viewed in FIGURE 3, and this motion is transmitted to shaft 42, which rotates to free arm 48, so that the bolt member is released from the nut member.

The tip 16 of hook member 12 is connected to bolt member 46 by a flexible metal cable 49, a ball 50 being fixed to each end of the cable and retained in suitable receptacles formed within the tip 16 and the bolt member 46, respectively. As seen in FIGURE 2, the arrangement is such that, if a force is applied to hook member 12 to pivot the same counter-clockwise, as viewed in FIGURE 2, while the bolt member is held against rotation, the cable 49 will then be held under tension and, when the hook member is freed, as seen in FIGURE 6, the cable 49 cannot fall free from the hook member.

Hook member 12 cooperates with a connector link 51 secured to the anchor line 3 and comprising spaced parallel side members 52 secured together at their ends by cylindrical pins 53 and 54. Pin 53 extends through circular openings in side members 52 and is retained by cotter pins, being free to turn relative to the side arms. As will be clear from a comparison of FIGURES 2 and 6, pin 53 is engaged in notch 17 to secure the connector device to the anchor line, when hook member 12 is pivoted to the raised position seen in FIGURE 2, but passes through space 18 to escape freely from the connector device, when the hook member is allowed to pivot in a counterclockwise direction, as in FIGURE 6.

As best seen in FIGURE 2, notch 17 is offset from the position of pin 10 toward the tip 16 of the hook member. Accordingly, when the pin 53 is engaged in notch 17, and hook member 12 is pivoted upwardly to the position seen in FIGURE 2, with bolt member 46 retained in nut member 45 (arm 48 being held against turning), the downward force applied to pin 53 by the anchor line acts through a small moment arm which tends to pivot hook member 12 counterclockwise. This action applies a downward force to cable 49 so that, when squibs 35 are fired to actuate arm 32 and thus cause shaft 42 to turn and free bolt member 46 for rotation, the bolt member will be pulled downwardly and, as it rotates will disengage from nut member 45, so that the hook member pivots counterclockwise and link 51 is allowed to escape, freeing the anchor line and allowing the buoy 2 to surface.

The coupling means constituted by device 44 can be actuated automatically by various types of conventional devices (not shown) carried within housing 20. For example, a clock-driven time-switch can be employed to complete a circuit to supply activating current to squibs 35 at the end of a time period for which the time switch is adjusted preparatory to submerging the buoy 2. Alternatively, an acoustic receiving transducer 56 can be provided, as indicated in FIGURES 1 and 2, to energize a conventional squib-firing circuit, contained within housing 20, in response to arrival of an acoustic command signal transmitted from a vessel at the surface of the body of water.

In typical installations, as for oceanographic purposes, the anchor may be on the ocean floor at a depth of 5,000 feet, for example, the connector device 1 may be, say, 50–100 feet above the anchor, and the line 4 will be of a length determined by the depth at which it is desired to maintain the buoy.

Figure 7:
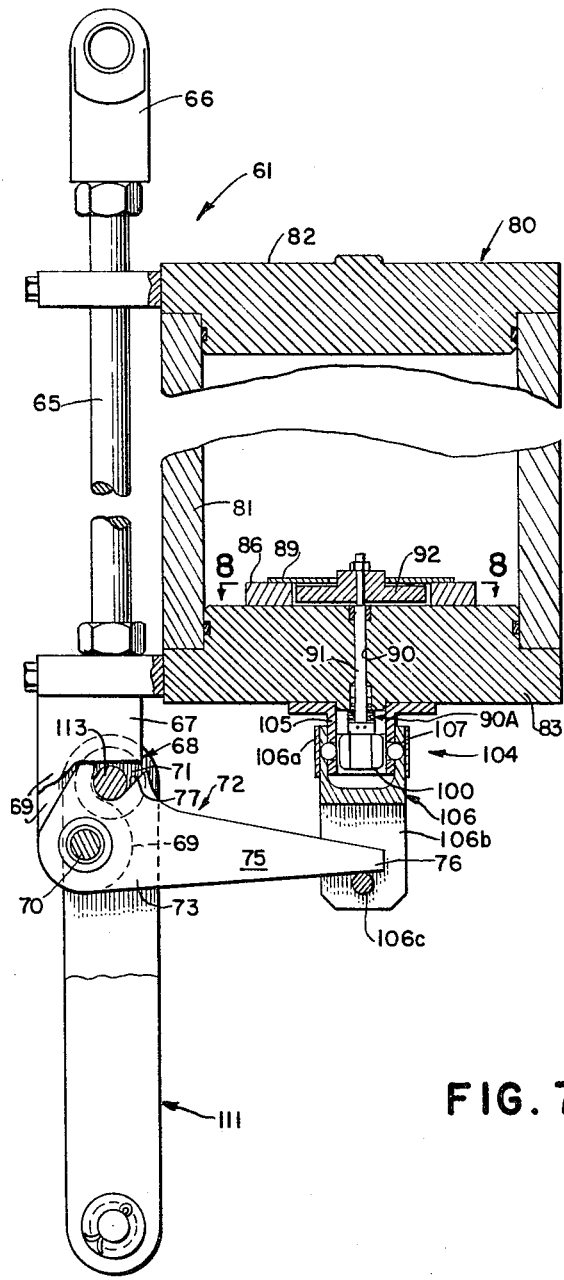
FIGURE 7 is a view, partly in side elevation and partly in vertical section, of a connector device in accordance with another embodiment of the invention.
Figure 8:
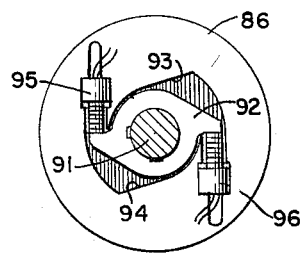
FIGURE 8 is a transverse sectional view taken on line 8—8, FIGURE 7.

Turning now to the embodiment shown in FIGURES 7 and 8, the connector device 61 includes a rod 65 provided at one end with an eye 66 for connection to the line 4, FIGURE 1. At its other end, rod 65 is secured rigidly to the base 67 of clevis 68. Clevis 68 includes side arms 69, projecting away from rod 65 and thus downwardly, when the connector device is in upright position, as seen in FIGURE 7. A clevis pin 70 extends between the end portions of arms 69 and parallel to base 67. Side arms 69 of the clevis are provided with laterally opening notches 71.

A hook member 72 is pivotally carried by the clevis pin 70 and includes a main portion 73 and an extended arm 75. Arm portion 75 terminates in a tip 76, the length of arm 75 being such that, when the arm is pivoted to the upper position, seen in FIGURE 7, tip 76 is disposed below the center of housing 80. The main portion 73 of hook member 72 is provided with a notch 77 which opens upwardly, toward base 67, when the hook member occupies its upper, horizontal position, as seen in FIGURE 7.

The housing 80 is secured to rod 65, as by clamps 79, and includes main body portion 81 and end caps 82 and 83. Secured in any suitable manner to the upper surface of end cap 83 is a generally ring-like member 86 which coacts with end cap 83 and cover plate 89 to define a recess to accommodate operating member 92 and actuator squibs 95. A thrust bearing 90A is provided to accommodate axial loads imposed on shaft 91 by hydrostatic pressures working on the outside of housing 20 when the device is submerged. The operating member 92 is rigidly secured to a shaft 91 journalled in and extending completely through the central bore 90 in end cap 83. As seen in FIGURE 8, member 86 defines a space similar to recess 26, FIGURE 3, and provided with stop surfaces 93 and 94 to limit the rotational travel of operating member 92 from the initial position illustrated in FIGURE 8.

The actuating squibs 95 are identical to squibs 35, FIGURE 3, hereinbefore described and operative, when activated to drive operating member 92 in a counterclockwise direction as viewed in FIGURE 8.

The lower end portion of shaft 91 projects below the bottom surface of end cap 83 and has fixedly attached thereto the rotatable element 100 of a releasable coupling indicated generally at 104. Coupling 104 comprises an annular stationary member 105 rigidly attached to the bottom surface end cap 83 and disposed concentrically with respect to the rotatable element 100. The coupling also includes a releasable element 106 having a cylindrical upper portion 106a telescopically surrounding element 105. Element 106 also includes dependent parallel arms 106b the lower end portions of which are bridged by a restraining pin 106c

Member 105 is provided with a plurality of radially directed ports, and the upper portion 106a of member 106 is provided with a cooperating series of inwardly opening recesses. The ports and recesses accommodate locking balls 107. The rotatable element 100 of the releasable coupling is provided with a plurality of angularly spaced, outwardly opening notches equal in number to the ports provided in the stationary element 105. Accordingly, when shaft 91 and element 104 are in one rotational position, the portions of element 100 which are of maximum diameter will serve to retain balls 107 within the ports in element 105 and the recesses in portion 106a of element 106, and element 106 will accordingly be rigidly locked to the stationary elements 105. However, when shaft 91 and rotatable element 100 are turned through a predetermined rotational distance, as a result of activation of squibs 95, the notches in element 100 are brought into registry with the ports in element 105, allowing the balls 107 to be forced radially inwardly, out of engagement with element 106, so that element 106 is released and can fall free from end cap 83. In this connection, it will be understood that the recesses in the upper portion 106a of member 106 are suitably formed to cam the locking balls 107 inwardly as a result of downward force applied to element 106.

The notch 77 in hook member 72 cooperates with the upper, cylindrical pin 113 of a connector link 111 to be attached to the anchor line 3, FIGURE 1. Thus, when pin 113 is engaged in notch 77, and the hook member 72 is pivoted to its upper position, as seen in FIGURE 7, the anchor line will be effectively locked to rod 65. The releasable element 106 of coupling 104 serves to retain the hook member in its locking position. Thus, the arm 75 of the hook member is of such length as to engage over pin 106c, carried by element 106, when the hook member has been pivoted to its upper position and the element 106 installed in locked position in coupling device 104. Notch 77 is offset from the axis of clevis pin 70 toward the tip 75 of the hook member. Accordingly, a force applied downwardly via the anchor line or upwardly via rod 65, will provide a rotational moment, applied to the hook member, urging the releasable element 106 of the coupling downwardly. Thus, simultaneous activation of squibs 95 will be effective to result in positive release of element 106, so that the hook member is freed to pivot downwardly and release the connector link 111.

Though particularly advantageous embodiments of the invention have been chosen for illustrative purposes, it will be understood that various changes and modifications can be made therein, without departing from the scope of the invention as defined in the appended claims.

What is claimed is:

1. In a releasable connector of the type described, the combination of a connector including a relatively fixed element and a relatively movable element, said movable element being pivotable between a locking position and a releasing position; support means rigidly secured to said fixed element, said movable element extending adjacent said support means when said movable element is in said locking position; coupling means comprising at least a stationary element secured to said support means and a second element adapted to be selectively locked to and released from said stationary element, an element of said coupling means being rotatable relative to said stationary element to effect release of said second element; an operating member movably mounted on said support means; means operatively connected to said operating member and said rotatable element of said coupling means to effect rotation of said rotatable element to release said second element of said coupling means when said operating member is actuated in a given direction, power means operatively arranged relative to said operating member to actuate the same in said given direction; and means interconnecting said second element of said coupling means and said pivotable element of said connector to prevent said pivotable element from pivoting to said releasing position so long as said second element of said coupling means is locked to said stationary element.

2. A releasable connector according to claim 1, wherein said support means is a housing having a longitudinal axis extending at right angles to the axis of pivotal movement of said pivotable element of said connector, said coupling means is located outside of said housing, and said operating member and said power means are disposed within said housing.

3. A releasable connector according to claim 1, wherein said support means includes a support member extending parallel to the axis of pivotal movement of said pivotable element of said connector and spaced therefrom, said coupling means located on the side of said support member adjacent said axis, said operating member and said power means are located on the other side of said support member, and said means operatively connected to said operating member and said rotatable element includes a member extending through said support member.

4. A releasable connector according to claim 1, wherein said support means includes a flat member, said coupling means is located on one side of said flat member with said rotatable element thereof arranged for rotation about an axis at right angles to said flat member, said operating member is disposed on the other side of said flat member and mounted for swinging movement about an axis at right angles to said flat member, and said means operatively connected to said operating member and said rotatable elements includes a shaft extending through and at right angles to said flat member.

5. A releasable connector according to claim 4, wherein said flat member constitutes one wall of a sealed chamber which encloses said operating member and said power means.

6. A releasable connector according to claim 4, wherein said operating member is fixed to said shaft and said shaft is connected to said rotatable element of said coupling means.

7. A releasable connector according to claim 6, wherein said stationary element of said coupling means is annular, said second element of said coupling means is telescopically related to said stationary element, said rotatable element of said coupling means is separate from said second element and concentric with respect thereto, and said second element and said stationary element are locked together by at least one lock member extending through an opening in said stationary element only when said rotatable element is in a predetermined rotational position.

8. A connector according to claim 1, wherein said operating member is mounted for swinging movement and includes two portions spaced apart across the axis of swinging movement thereof, and said power means includes two explosively operated devices each arranged to apply an operating force to a different one of said two portions and both arranged to actuate said operating member in the same direction.

9. A releasable connector according to claim 1 and further comprising, stop means mounted on said support means for movement between a first position, in which said stop means restrains said rotatable element of said coupling means against rotation, and a second position, in which said rotatable element of said coupling means is free to rotate, said means operatively connected to said operating member and said rotatable element of said coupling means including said stop means.

10. In a device for releasably connecting a buoy or the like to an anchor line, the combination of a clevis including a base to be connected to the buoy or the like and two spaced legs; a clevis pin carried by and extending between said legs and spaced from said base; support means rigidly connected to said base and including a support member spaced laterally from said base; a hook member mounted on said clevis pin for pivotal movement about the axis thereof, said hook member including a first portion capable of being accommodated in the space between said clevis pin and said base and a second portion in the nature of an arm projecting from said first portion, said first portion having a notch opening away from said clevis pin and adapted to receive and retain an element connected to the anchor line, said hook member being pivotable between a locking position, in which said notch opens toward said base and said second portion extends adjacent said support member, and a second position, in which said notch opens away from said base for release of the element connected to the anchor line; a releasable coupling including a first part secured to said support member and a second part connected to said second portion of said hook member at a point spaced from said clevis pin, said coupling comprising a rotatable part and being operative to lock said second part to said first part, to restrain said hook member against movement from said locking position, when said rotatable part is in one rotational position, and to release said second member, allowing said hook member to pivot to its second position, when said rotatable part is in another rotatable position; an operating member movably mounted on said support member; power means operatively arranged relative to said operating member to move the same in a given direction; and means interconnecting said operating member and said rotatable part of said coupling to convert movement of said operating member into rotary movement of said rotatable part from said one rotational position to said other rotational position, said notch being offset from said clevis pin toward the end of said second portion of said hook member, whereby a strain applied to the anchor line via said clevis creates a rotational movement tending to pivot said hook member from said locking position to said second position.

11. A device according to claim 10 and wherein said support member constitutes a wall of a sealed housing which encloses said operating member and said power means.

12. A device according to claim 11 and further comprising an elongated member secured to said base of said clevis and extending from said base on the side opposite from said legs; said housing extending beside said elongated member and being secured thereto.

References Cited by the Examiner

UNITED STATES PATENTS 2,422,839    6/1947    Maskey.
3,228,332    1/1966    Snyder _____ 294—83 X

FOREIGN PATENTS 958,040    3/1950    France.

BERNARD A. GELAK, *Primary Examiner.*